United States Patent
Ichihara et al.

(10) Patent No.: US 7,645,363 B2
(45) Date of Patent: Jan. 12, 2010

(54) MANUFACTURING OF MAGNETIC RECORDING MEDIUM

(75) Inventors: Takayuki Ichihara, Tokyo (JP); Yoshinori Honda, Kanagawa (JP)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 583 days.

(21) Appl. No.: 11/415,801

(22) Filed: May 1, 2006

(65) Prior Publication Data
US 2006/0249371 A1 Nov. 9, 2006

(30) Foreign Application Priority Data
May 6, 2005 (JP) ............... 2005-135219

(51) Int. Cl.
*C23C 14/34* (2006.01)
(52) U.S. Cl. ............... 204/192.2; 204/298.12; 204/298.13
(58) Field of Classification Search ............ 204/192.2
See application file for complete search history.

(56) References Cited

U.S. PATENT DOCUMENTS

| | | | |
|---|---|---|---|
| 6,777,112 B1* | 8/2004 | Girt et al. | 428/828 |
| 6,815,082 B2* | 11/2004 | Girt | 428/828.1 |
| 7,169,488 B2* | 1/2007 | Chen et al. | 428/833.3 |
| 2003/0138671 A1 | 7/2003 | Oikawa et al. | |
| 2003/0157375 A1 | 8/2003 | Uwazumi et al. | |
| 2004/0057157 A1* | 3/2004 | Shimizu et al. | 360/135 |
| 2004/0191571 A1 | 9/2004 | Hirayama et al. | |
| 2004/0234818 A1* | 11/2004 | Tanahashi et al. | 428/694 TM |
| 2004/0253485 A1* | 12/2004 | Nolan | 428/694 T |

FOREIGN PATENT DOCUMENTS

| | | |
|---|---|---|
| JP | 62-212929 A | 9/1987 |
| JP | 2001-295037 | 10/2001 |
| JP | 2001-351217 | 12/2001 |
| JP | 2003-281707 | 10/2003 |
| JP | 2004-339586 | * 12/2004 |

OTHER PUBLICATIONS

Machine Translation JP 2004-339586 publication date Dec. 2, 2004.*
Zheng, M. et al., "Role of Oxygen Incorporation in Co-Cr-Pt-Si-O Perpendicular Magnetic Recording Media", *IEEE Transactions on Magnetics*, vol. 40, No. 4, Jul. 2004: 2498-2500.
State Intellectual Property Office of China (SIPO) office action for SIPO patent application CN2006-10079469.4 (Jan. 4, 2008).

* cited by examiner

*Primary Examiner*—Rodney G McDonald
(74) *Attorney, Agent, or Firm*—Townsend and Townsend and Crew LLP; Darren Gold

(57) ABSTRACT

A magnetic recording medium having excellent fly-ability and corrosion resistance is provided in a high yield by controlling protuberant on a medium surface caused by deposition of giant silicon oxide particles, which are created during the film deposition of a granular recording layer including Si and oxygen. In one embodiment of the invention, a recording layer is deposited by a sputtering method using a target which is composed of a mixture of an alloy including at least Co and powdered crystalline $SiO_2$.

22 Claims, 6 Drawing Sheets

MANUFACTURING OF MAGNETIC RECORDING MEDIUM

CROSS-REFERENCES TO RELATED APPLICATIONS

This application claims priority from Japanese Patent Application No. JP2005-135219, filed May 6, 2005, the entire disclosure of which is incorporated herein by reference.

BACKGROUND OF THE INVENTION

The present invention relates to a method for manufacturing a magnetic recording medium. In particular, the present invention relates to a method for manufacturing a magnetic recording medium applied to a perpendicular magnetic recording technology.

Attention has been paid to perpendicular magnetic recording system as a technology for improving the areal recording density to achieve an increase in the capacity of a magnetic recording device. A perpendicular magnetic recording system is a means to form the recording bits in which magnetization of the recording medium is made normal to the medium face and the magnetization in the adjacent recording bits is made anti-parallel to each other. In a perpendicular magnetic recording system, since the diamagnetic field in the magnetic transition region is small, a sharp magnetic transition region is created compared with a longitudinal magnetic recording system, resulting in the magnetization being stabilized at a high density. Therefore, compared with a longitudinal magnetic recording system, it is possible to make the film thickness greater and the volume of the ferromagnetic grains greater to obtain the same resolution, thus it is possible to control the time-varying decay of the recorded magnetization, that is, the thermal demagnetization. Moreover, when it is combined with a perpendicular magnetic recording medium which has a single pole type head, a perpendicular recording layer, and a soft magnetic underlayer, a high recording magnetic field can be obtained and selecting a material having a high magnetic anisotropy for the perpendicular recording layer becomes possible, so that the thermal demagnetization can be further controlled.

In these days, a CoCr-based alloy crystalline film has been the mainstream for a material of a recording layer of a perpendicular magnetic recording medium. The easy axis of the recording layer can be maintained perpendicular by controlling the crystallographic texture to make the c-axis of a CoCr crystal having a hexagonal close-packed (hcp) structure normal to the medium face. Herein, the media noise can be reduced by making the grain size of the CoCr-based crystal smaller, decreasing the distribution, and reducing the intergranular magnetic exchange interaction, thereby, the recording density can be improved. As a means to control such a recording layer structure, a recording layer, in general a so-called granular thin film, is proposed in which ferromagnetic grains are surrounded by a non-magnetic material such as an oxide. In a granular recording layer, a non-magnetic grain boundary phase separates the magnetic grains, the intergranular exchange coupling is decreased, and the noise at the magnetic transition region can be reduced. JP-A No. 178413/2003 discloses a perpendicular magnetic recording medium which has a recording layer composed of a ferromagnetic alloy containing Co and Pt and an oxide having a volume density from 15% to 40%. Moreover, in IEEE Transactions on Magnetics, Vol. 40, No. 4, July 2004, pp. 2498-2500, "Role of Oxygen Incorporation in Co—Cr—Pt—Si—O Perpendicular Magnetic Recording Media", a means was disclosed for depositing a recording layer which has a granular structure by a DC magnetron sputtering method in an argon-oxygen mixed gas atmosphere using a complex target containing a CoCrPt alloy and $SiO_2$. It is reported that the coercivity is increased and the read/write characteristics is improved by doing a reactive sputtering in an atmosphere including oxygen.

Moreover, in a magnetic recording medium for a longitudinal recording system which has been used conventionally, a magnetic recording medium having a granular structured recording layer has been disclosed in JP-A No. 178423/2003.

BRIEF SUMMARY OF THE INVENTION

In the aforementioned manufacturing method for a magnetic recording medium, in general, a target is used to deposit the recording layer, in which a CoPt alloy and powdery amorphous $SiO_2$ are mixed and deposited using a sintering method etc., into a target. In this manufacturing method, there is a problem that silicon oxide with a comparatively large particle size is dispersed from the target and deposited on the medium, resulting in protuberant defects being created. In the case when the flying height of the magnetic head is less than 20 nm, there is a fear of the magnetic head and the magnetic recording medium being damaged by crashing the magnetic head with the protuberant and of the device breaking down. Moreover, even in the case when the protuberant is removed by a surface polishing process for the magnetic recording medium, there is still a problem that the fly-ability and the corrosion resistance are remarkably deteriorated by a dropout of the removed portions of the recording layer and of the overcoat and by damage of the medium surface caused by the peeled particles.

A feature of the present invention is to provide a manufacturing method for a magnetic recording medium to solve these problems, wherein the fly-ability and corrosion resistance are excellent and the failure rate of the magnetic recording device is reduced.

An aspect of the present invention is directed to a mechanism of forming a recording layer by a sputtering method using a target which is composed of a mixture of an alloy containing at least Co and powdered crystalline $SiO_2$ when the recording layer consisting of magnetic crystalline grains and non-magnetic grain boundaries surrounding them, of which the main component is Si oxide, is deposited on a non-magnetic substrate by a sputtering method. A sputtering method which uses DC sputtering and a DC pulse power supply (DC pulse sputtering method) and an RF sputtering method can be used for the sputtering method.

According to the present invention, the recording layer is deposited by a sputtering method using a target in which powdered crystalline $SiO_2$ is mixed, thereby, the flying of the large particles of silicon oxide from the target is controlled and protuberant on the surface of the medium is reduced. Therefore, it is possible to provide a manufacturing method for a magnetic recording medium which has excellent flying-ability and reliability and has a high yield.

DETAILED DESCRIPTION OF THE INVENTION

Hereinafter, the specific embodiments, in which a manufacturing method for the present invention is applied to a perpendicular magnetic recording medium and a longitudinal magnetic recording medium, will be described with reference to the accompanying drawings as follows.

Embodiment 1

Figure 2:
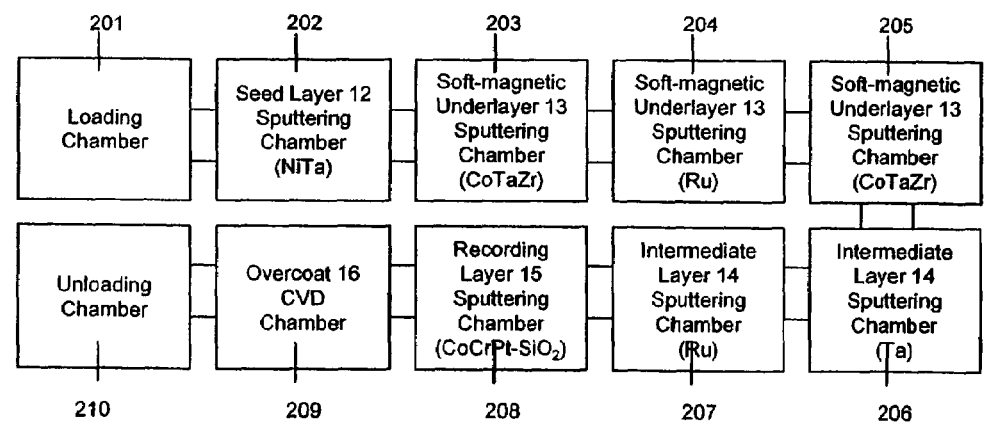
FIG. 2 is a schematic drawing illustrating film deposition apparatus for a perpendicular magnetic recording medium in a manufacturing method of the embodiment 1.

A perpendicular magnetic recording medium of the present invention is deposited by using in-line type sputtering apparatus shown in FIG. 2. Each chamber is independently evacuated. The processes are carried out in order by evacuating all chambers in advance to a background pressure lower than or equal to $1 \times 10^{-5}$ Pa and transferring the carrier, which supports the substrate, to each process chamber. A carbon overcoat is deposited by a chemical vapor deposition (CVD) method, and other layers are deposited by a DC magnetron sputtering method.

Figure 3:
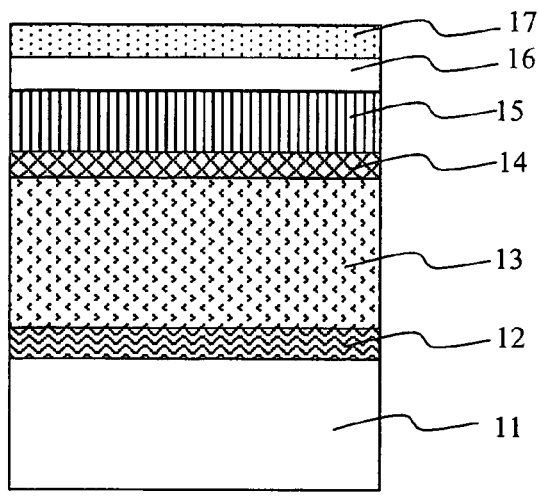
FIG. 3 is a schematic drawing illustrating a cross-sectional structure of a perpendicular magnetic recording medium fabricated by using a manufacturing method of the embodiment 1.

FIG. 3 is a schematic drawing illustrating a cross-sectional structure of a perpendicular magnetic recording medium fabricated by a manufacturing method of the embodiment 1. This perpendicular magnetic recording medium has a structure in which a seed layer 12, a soft-magnetic underlayer 13, a grain size control layer 14, a granular recording layer 15, an overcoat 16, and a liquid lubricant layer 17 are deposited in order on a substrate 11. However, the structure described in FIG. 3 illustrates one example, and it is to be understood that a perpendicular magnetic recording medium fabricated by a manufacturing method of the present invention is not intended to be limited to the structure shown in FIG. 3.

Figure 4:
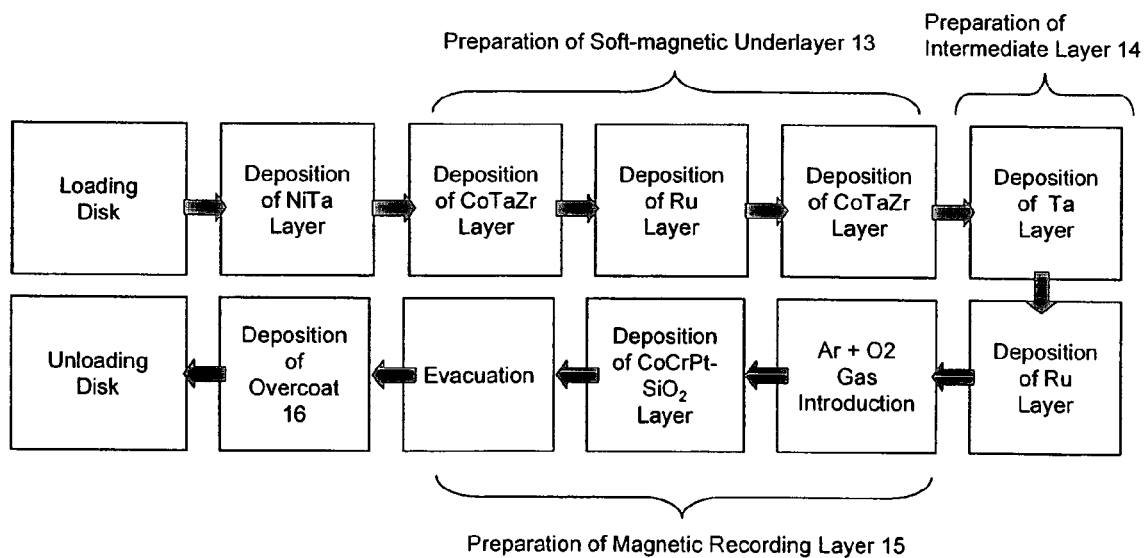
FIG. 4 is a schematic drawing illustrating a film deposition process of a perpendicular magnetic recording medium in a manufacturing method of the embodiment 1.

FIG. 4 is a schematic drawing of a manufacturing procedure of this medium and the manufacturing conditions are shown as follows. A glass substrate with a diameter of 63.5 mm was used for the substrate 11. The substrate 11 was carried from the loading chamber 201; the substrate is carried into the seed layer sputtering chamber 202 after evacuation; and the 30 nm thick seed layer 12 composed of a NiTa alloy is deposited on the substrate 11 to enhance the adhesiveness with the substrate. Herein, a Ni-37.5 at. % Ta target was used for the deposition of the seed layer 12. The seed layer 12 only has to be able to maintain the adhesiveness for both the substrate and the upper layer of the seed layer, so that any of Ni-based alloys, Co-based alloys, and Al-based alloys can be used. For instance, a NiTaZr alloy, a NiAl alloy, a CoTi alloy, and an AlTa alloy can be used.

Next, in the soft-magnetic underlayer sputtering chambers 203 to 205, a 50 nm thick CoTaZr alloy, a 0.8 nm thick Ru, and a 50 nm thick CoTaZr were deposited in order to make the soft-magnetic underlayer 13 a three-layered structure. Herein, a Co-3 at. % Ta-5 at. % Zr target was used for the deposition of the CoTaZr layer. Noise caused by the soft-magnetic underlayer can be reduced by making such a three-layered structure because the upper and lower CoTaZr alloy layers are anti-ferromagnetically coupled to each other through the Ru layer.

The kind of soft-magnetic material and the film thickness can be selected within the range where adequate overwrite performance for writing is obtained. For instance, a CoNbZr alloy, a CoTaNb alloy, and an FeCoB alloy, etc. can be used in lieu of a CoTaZr alloy, and there is no problem if the total film thickness of the soft-magnetic underlayer is from 50 nm to 300 nm. A structure in which a magnetic domain control layer is provided to fix the magnetic domains of the soft-magnetic underlayer underneath the soft-magnetic underlayer composed of one layer of a soft-magnetic material such as a CoTaZr alloy, etc. and a structure in which a magnetic domain control layer is provided underneath the three-layered structure may be used for the structure of the soft-magnetic underlayer.

Next, 1 nm thick Ta and 20 nm thick Ru were deposited in order in the intermediate layer sputtering chambers 206 and 207. An intermediate layer 14 controls the crystallographic texture and the grain size of the recording layer, and plays an important role to reduce the inter-granular exchange coupling of the recording layer. The film thickness, configuration, and material of the intermediate layer 14 may be selected within the range where the aforementioned effects can be obtained, and it is to be understood that the invention is not intended to be limited to the aforementioned specific film thickness, configuration, and material. The role of the Ta layer in the aforementioned structure of the intermediate layer is to improve the c-axis orientation in a direction perpendicular to the film plane. The film thickness may be controlled within the range where this is satisfied, and a value from about 1 nm to 5 nm is typically used. Pd, Pt, and Cu which have a face-centered cubic (fcc) lattice structure, an alloy based on these elements, a ferromagnetic FCC material such as NiFe, etc. and a material having an amorphous structure such as NiTa may be used in lieu of Ta. The role of the Ru layer is to control the grain size and the crystallographic orientation, and to reduce the inter-granular exchange coupling. The film thickness may be controlled within the range where this is satisfied, and a value from about 3 nm to 30 nm is typically used. Moreover, a Ru-based alloy and one in which an oxide such as $SiO_2$ etc. is contained in the Ru may be used in lieu of Ru.

Next, after delivering it to the recording layer sputtering chamber 208, an argon-oxygen mixed gas was introduced, a 14 nm thick first recording layer 15 was deposited, and the residual oxygen in the chamber was reduced by vacuum pumping to 0.5 Pa or less. An alloy-oxide composite target, in which a Co-13 at. % Cr-20 at. % Pt alloy and crystalline $SiO_2$ having a grain size of 1 μm were mixed with a ratio of 88:12 mol % and formed by a sintering technique, was used for deposition of the recording layer 15. The deposition rate of the recording layer 15 was controlled to be 2.6 nm/s.

Subsequently, after delivering it to the carbon overcoat CVD chamber 209, a 4 nm thick DLC (diamond like carbon) film was deposited as an overcoat 16 by using a chemical vapor deposition (CVD) method. The thickness was controlled to be 4 nm. Then, after taking the substrate out of the unloading chamber 210, the chamber was open to atmospheric pressure and the substrate was taken out of the sputtering apparatus, and a lubricant layer 17 was deposited thereon by applying an organic-based lubricant.

Argon gas was used as a sputtering gas when a Ru layer of the intermediate layer 14 was deposited. There was no problem when the gas pressure was controlled to be from about 2 Pa to 6 Pa, but 5 Pa was selected herein. An argon-oxygen mixed gas was used as a sputtering gas when the recording layer 15 was deposited. There was no problem when the total gas pressure was from about 3 Pa to 6 Pa, but 4 Pa was selected herein. The oxygen concentration in the argon-oxygen mixed gas may be controlled within a range to obtain an adequate SNR, and 2.5% was selected herein. A mixed gas in which hydrogen and nitrogen were mixed with ethylene to 20% and 2%, respectively, was used for the deposition of the carbon overcoat, and 2 Pa was selected to be the total gas pressure. Deposition of the other layers was carried out under a gas pressure of 1 Pa, and argon was used as the sputtering gas.

A manufacturing method which includes a process for depositing the recording layer 15 by sputtering using a target containing amorphous $SiO_2$ is made a comparative example 1 for the purpose of comparing the embodiment 1 with a conventional manufacturing method. In the manufacturing method of the comparative example 1, a target, in which a Co-13 at. % Cr-20 at. % Pt alloy and amorphous $SiO_2$ having a grain size of 1 μm were mixed with a ratio of 88:12 mol % and deposited by a sintering technique, was used for deposition of the recording layer 15. The film structure and the process conditions for fabricating the recording layer were the same as the embodiment 1 except for the target.

The evaluation of the crystal structure of $SiO_2$ powder added to the target was carried out by X-ray diffraction system using CuKα rays. The evaluation of the number of surface protuberant of the magnetic recording medium was carried out using optical surface analyzer by counting the number of protuberant greater than and equal to 0.2 μm for each medium surface. The signal-media noise ratio SNRd of the fabricated magnetic recording medium was evaluated by a typical recording performance evaluation tester using a complex single pole type head which has a writing pole width of 170 nm and a reading element width of 125 nm. SNRd was evaluated by the ratio of the read back output and the media noise at a linear recording density of 15.7 kfr/mm.

Figure 5:
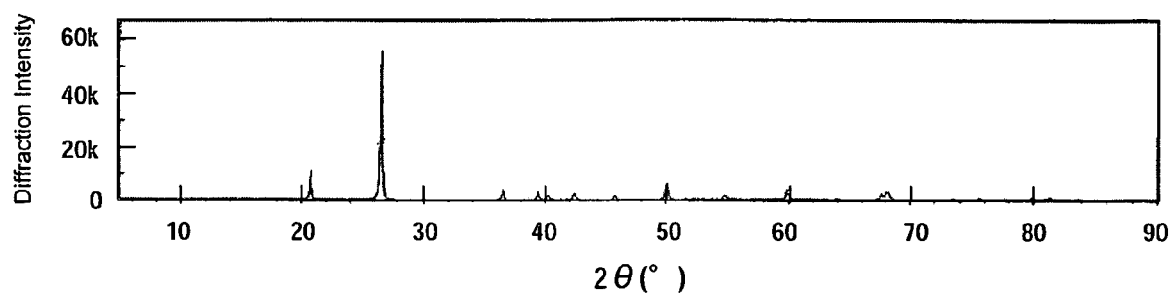
FIG. 5 shows an XRD diagram of powdered crystalline $SiO_2$ added in a target for a recording layer in a manufacturing method of the embodiment 1.
Figure 6:
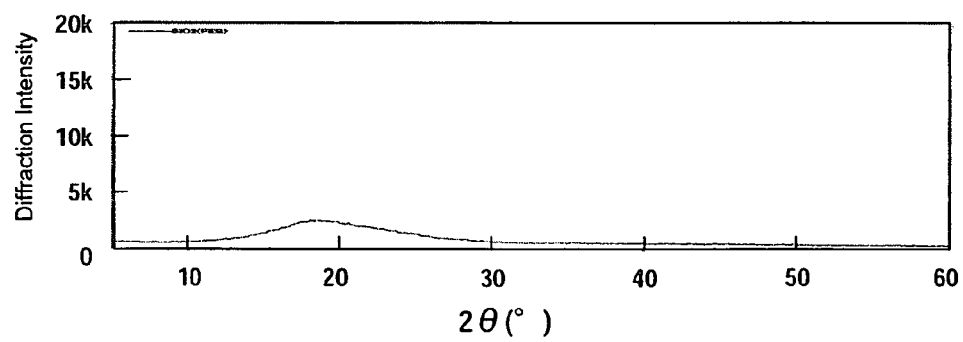
FIG. 6 shows an XRD diagram of amorphous $SiO_2$ powder added in a target for a recording layer in a manufacturing method of the embodiment 1.

FIG. 5 is an XRD diagram of powdered crystalline $SiO_2$ which is added to the target for the recording layer used for the embodiment 1. Moreover, FIG. 6 is an XRD diagram of amorphous $SiO_2$ which is added to the target for the recording layer used for the comparative example 1. As shown in FIG. 5, the $SiO_2$ powder added to the target for the recording layer used for the manufacturing method of the present invention has a main peak at a Bragg angle $2\theta=26.6\pm0.1°$.

Figure 7:
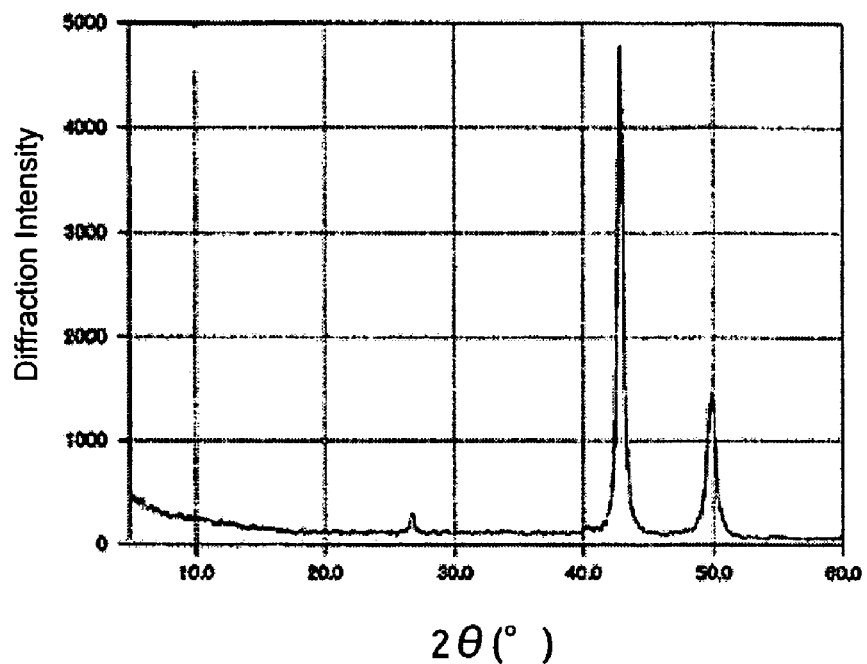
FIG. 7 shows an XRD diagram of a target for a recording layer in a manufacturing method of the embodiment 1.
Figure 8:
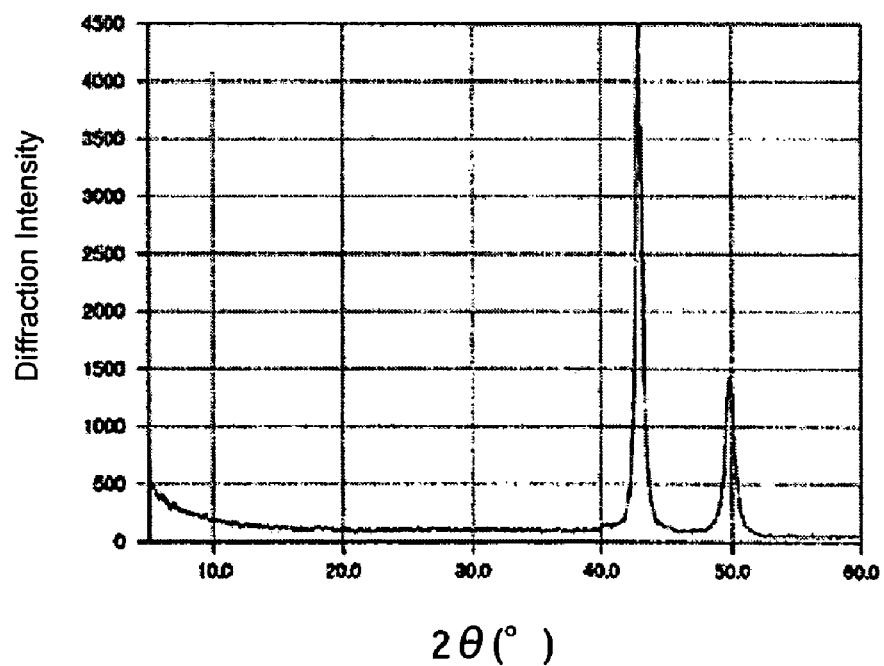
FIG. 8 shows an XRD diagram of a target for a recording layer in a manufacturing method described in the comparative example 1.

FIG. 7 is an XRD diagram of the target for the recording layer used for the manufacturing method of embodiment 1. Moreover, FIG. 8 is an XRD diagram of the target for the recording layer used for the manufacturing method of the comparative example 1. As shown in FIG. 7, the target for the recording layer used for the manufacturing method of the present invention also has a peak at a Bragg angle $2\theta=26.6\pm0.1°$.

Figure 1:
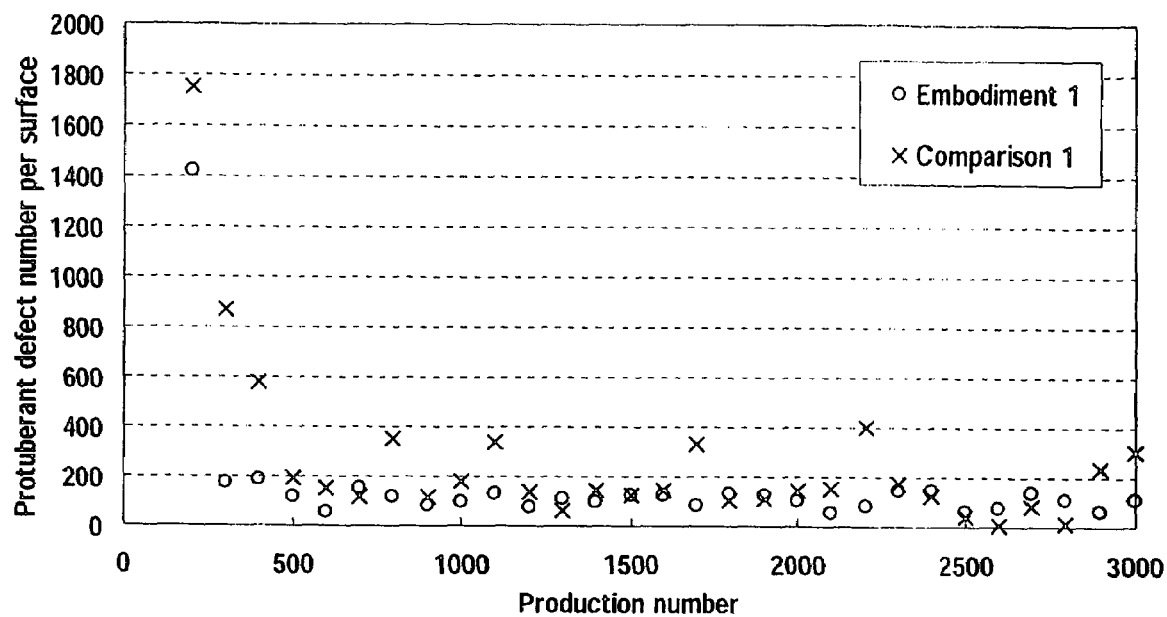
FIG. 1 is a graph showing the change of the number of surface protuberant defects of a perpendicular magnetic recording medium with the production number deposited by manufacturing methods of the embodiment 1 and the comparative example 1.

FIG. 1 shows the change of the number of protuberant defects greater than and equal to 0.2 μm at the medium surface with production number when 3000 layers of perpendicular recording media were fabricated by the manufacturing methods of the embodiment 1 and the comparative example 1. At the beginning of deposition, the protuberant defect number was great in both manufacturing methods caused by the effects of contamination at the surface of the target. However, in the manufacturing method of the embodiment 1, the protuberant defect number became less than 200 per surface after the production of about 300 layers, and the good condition was maintained in all of the following depositions in which the protuberant defect number was kept less than and equal to 200 per surface. On the other hand, in the comparative example 1, the protuberant defect number less than and equal to 200 could be achieved when the number of productions reached about 500, which was greater than the embodiment 1, and some media had a protuberant defect number greater than or equal to 200 in the following depositions.

Figure 9:
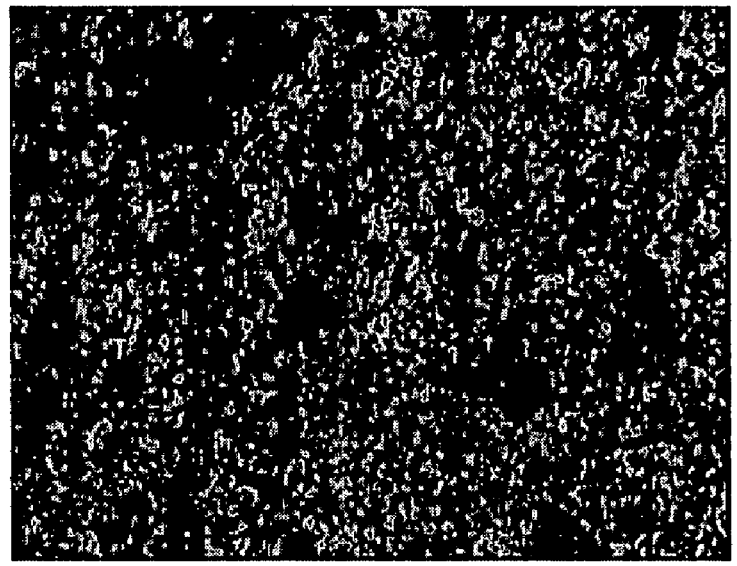
FIG. 9 shows a surface microphotograph of a target for a recording layer used for the manufacturing method of the embodiment 1 after the production of 3000 layers.
Figure 10:
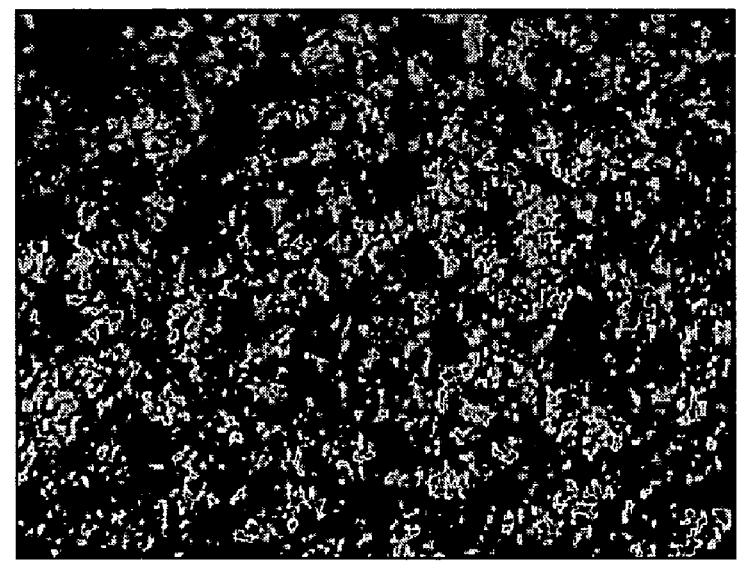
FIG. 10 shows a surface microphotograph of a target for a recording layer used for the manufacturing method of the comparative example 1 after the production of 3000 layers.

FIGS. 9 and 10 show the surface microphotographs of targets for the recording layers used for the embodiment 1 and the comparative example 1, respectively, after the production of 3000 layers. The target used for the comparative example 1 has a rough surface and, on the other hand, the period of surface roughness of the target used in the embodiment 1 is small and relatively smooth. It is understood that large $SiO_2$ particles were created by sputtering in the target used for the comparative example 1.

The above-mentioned results will be discussed as follows. In the powdered crystalline $SiO_2$, a $SiO_2$ tetrahedral structure is formed by covalent bonding between Si atom and O atoms, and since all O atoms of a tetrahedron connect covalently with another tetrahedron, the bonding strength between the atoms is very strong. On the other hand, the powdered amorphous $SiO_2$ has a $SiO_2$ tetrahedral structure but the bonding among all tetrahedron is disorderly, as a result the bonding strength is weaker than that of crystalline $SiO_2$. Therefore, in the case when a target including amorphous $SiO_2$ is used, it is understood that silicon oxide particles having relatively larger size are separated at parts which are weakly bound and break away from the powder at a low collision energy, and reach the surface of the medium which is the reason for the protuberant defects. On the other hand, in the case when a target including crystalline $SiO_2$ is used, the energy at which the particles become separated from the $SiO_2$ powder is high and uniform, so that it is understood that protuberant defects are decreased due to the reduction of the probability that particles having larger sizes become separated.

Table 1 shows the yield rate of a perpendicular recording medium fabricated by the manufacturing methods of the embodiment 1 and the comparative example 1, in which they are evaluated by the media signal-noise ratio SNRd and the output variation caused by the media defects. The embodiment 1 and the comparative example 1 had the same SNRd values and the electromagnetic conversion characteristics of the magnetic recording medium fabricated by the manufacturing method of the embodiment 1 compare favorably with those of the comparative example 1. On the other hand, the protuberant defects were reduced in the magnetic recording medium fabricated by the manufacturing method of the embodiment 1, resulting in the yield rate being improved.

TABLE 1

|  | Embodiment 1 | Comparison 1 |
|---|---|---|
| SNRd (dB) | 18.6 | 18.5 |
| Yield (%) | 62.1 | 45.2 |

In the case when powdered crystalline $SiO_2$ and powdered amorphous $SiO_2$ are mixed in the $SiO_2$ powder added to the target, a sufficient improvement in the yield cannot be obtained because large particles fly from the amorphous $SiO_2$ powder and create the protuberant defects. Therefore, in a manufacturing method of a magnetic recording medium of the present invention, it is clear that maximum effects can be obtained by using powdered crystalline $SiO_2$ for the entire amount of powdered $SiO_2$ added to the target to form the granular recording layer.

Embodiment 2

Figure 11:
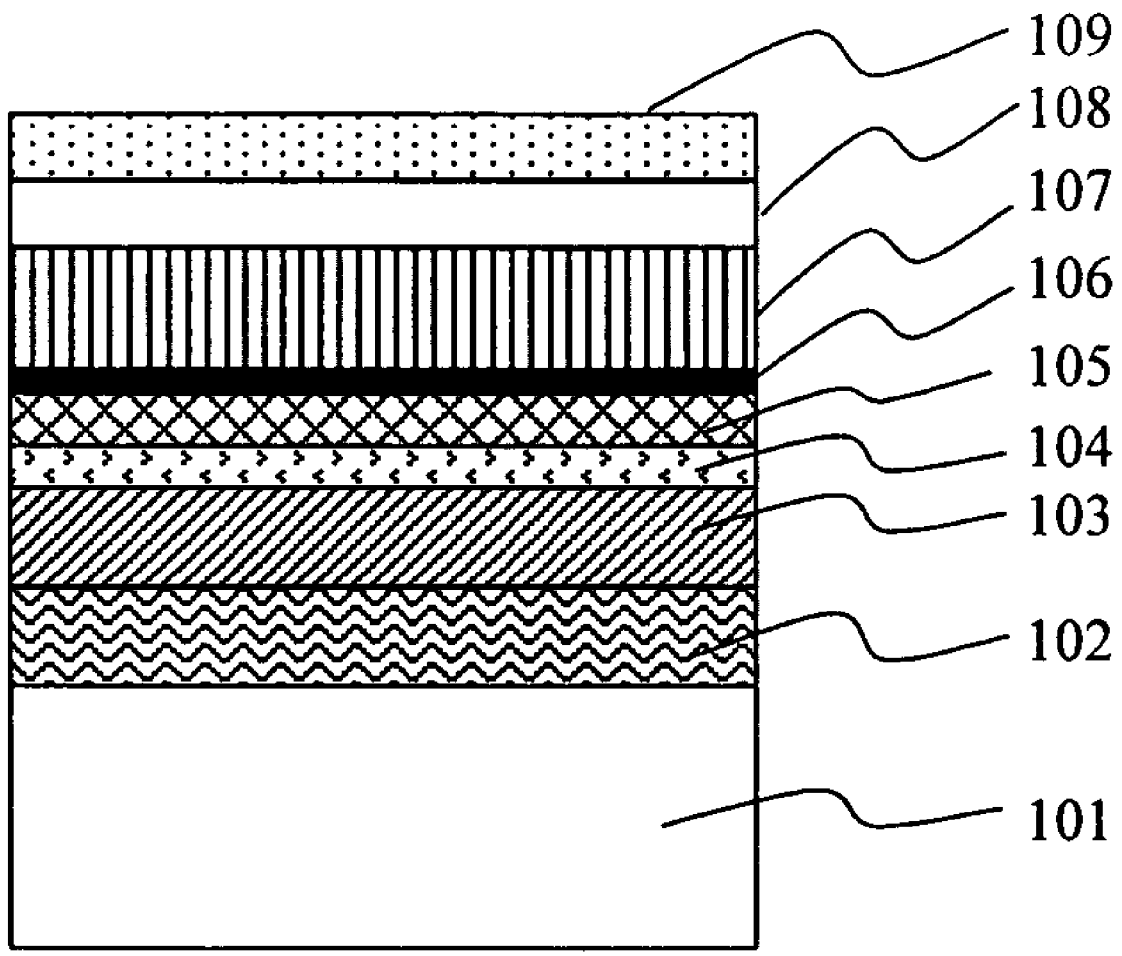
FIG. 11 is a schematic drawing illustrating a cross-sectional structure of a longitudinal magnetic recording medium used for the manufacturing method of the embodiment 2.

FIG. 11 is a schematic drawing of a cross-sectional structure of a longitudinal magnetic recording medium fabricated by a manufacturing method of embodiment 2. This longitudinal magnetic recording medium is one where a first seed layer 102, a second seed layer 103, an underlayer 104, a first recording layer 105, a Ru intermediate layer 106, a second recording layer 107, a overcoat 108, a liquid lubricant layer 109 are deposited in order on a substrate 101. However, the structure shown in FIG. 11 illustrates one example, and it is to be understood that a longitudinal magnetic recording medium fabricated by a manufacturing method of the present invention is not intended to be limited to the structure shown in FIG. 11.

The manufacturing conditions of the medium are shown as follows. A glass substrate with a diameter of 63.5 mm was used for the substrate 101. A 30 nm thick first seed layer 102 composed of a Ti—Al alloy was deposited on the substrate 101 by a sputtering method. Herein, a Ti-52 at. % Al target was used for the deposition of the first seed layer 102. Next, a 30 nm thick second seed layer 103 composed of a Ru—Al alloy was deposited thereon by a sputtering method. Herein, a Ru-50 at. % Al target was used for the deposition of the second seed layer 103. A 5 nm thick underlayer 104 composed of a Cr—Mo alloy was deposited thereon by a sputtering method. Herein, a Cr-20 at. % Mo target was used for the deposition of the underlayer 104.

A 5 nm thick first recording layer 105, a 0.6 nm thick Ru intermediate layer, and a 15 nm thick recording layer 107 were deposited in order on the underlayer 104. It is generally understood that the thermal fluctuation resistance becomes excellent and media noise can be reduced by making the recording layer in such a three-layered structure and coupling the first recording layer 105 and the second recording layer 107 anti-ferromagnetically through the Ru intermediate layer 106.

Herein, the same as the manufacturing method of the embodiment 1, the first recording layer 105 and the second recording layer 107 were deposited by a DC sputtering method in an argon-oxygen mixed gas using a target, which was composed of a mixture of a CoCrPt alloy and powdered crystalline $SiO_2$. A target, which is composed of a mixture of Co-12 at. % Cr-12 at. % Pt alloy and crystalline $SiO_2$ having a particle size of 1 μm with the ratio of 94:6 mol %, was used for the deposition of the first recording layer 105. A target, which is composed of a mixture of Co-11 at. % Cr-13 at. % Pt alloy and crystalline $SiO_2$ having a particle size of 1 μm with the ratio of 93:7 mol %, was used for the deposition of the second recording layer 107.

Then, the same as the manufacturing method of the embodiment 1, a 4 nm DLC protective layer 108 was deposited by a CVD technique, and the lubricant layer 109 was deposited after unloading it from the film deposition apparatus.

In order to evaluate the manufacturing method of the present invention, a manufacturing method including a process for forming the first recording layer 105 and the second recording layer 107 is assumed to be the comparative example 2, in which amorphous $SiO_2$ is added to the aforementioned target in lieu of crystalline $SiO_2$.

Table 2 shows the yield rate evaluated by the output variations caused by the media defects. Since the longitudinal recording medium generally has a smaller film thickness than a perpendicular recording medium and the scratch resistance is excellent, the yield rate is excellent. However, it becomes clear that the manufacturing method of the embodiment 2 using a target to which crystalline $SiO_2$ is added can improve the yield compared with the manufacturing method of the comparative example 2.

TABLE 2

|  | Embodiment 1 | Comparison 1 |
|---|---|---|
| Yield (%) | 67.5 | 58.3 |

According to the above description, a magnetic recording medium which has excellent fly-ability and corrosion resistance and can reduce the failure rate can be provided by a manufacturing method of a magnetic recording medium of the present invention. Especially, the production efficiency of a perpendicular recording medium, which has a greater film thickness than a longitudinal recording medium, can be remarkably improved.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A method for manufacturing a magnetic recording medium comprising:
   forming a non-magnetic underlayer over a non-magnetic substrate; and
   forming a recording layer containing at least Co, silicon, and oxygen over said non-magnetic underlayer by a sputtering method,
   wherein, a target used in forming said recording layer contains at least one selected from Co and a Co-based alloy and powdered silicon oxide in which said silica powder is crystalline.

2. A method for manufacturing a magnetic recording medium according to claim 1, wherein
   the powdered silicon oxide contained in said target has a main peak at a Bragg angle (2θ) of 26.6±0.1° in a powder X-ray diffraction spectrum by using CuKα rays.

3. A method for manufacturing a magnetic recording medium according to claim 1, wherein
   said target has a peak at a Bragg angle (2θ) of 26.6±0.1° in an X-ray diffraction spectrum by using CuKα rays.

4. A method for manufacturing a magnetic recording medium according to claim 1, further comprising:
   forming a soft magnetic underlayer over said non-magnetic substrate; and
   forming an intermediate layer on said soft magnetic underlayer.

5. The method for manufacturing a magnetic recording medium according to claim 4, wherein said soft magnetic underlayer is formed over said non-magnetic underlayer prior to forming said recording layer.

6. The method for manufacturing a magnetic recording medium according to claim 4, wherein said soft magnetic underlayer comprises a three-layered structure of a CoTaZr alloy layer, a Ru layer, and another CoTaZr layer.

7. The method for manufacturing a magnetic recording medium according to claim 4, wherein said soft magnetic underlayer comprises a 50 nm thick CoTaZr alloy, a 0.8 nm thick Ru, and a 50 nm thick CoTaZr.

8. The method for manufacturing a magnetic recording medium according to claim 1, wherein said non-magnetic underlayer comprises a NiTa alloy.

9. The method for manufacturing a magnetic recording medium according to claim 1, wherein said non-magnetic underlayer is a first non-magnetic underlayer, and further comprising forming a second non-magnetic underlayer over said first non-magnetic underlayer.

10. The method for manufacturing a magnetic recording medium according to claim 9, wherein the first non-magnetic underlayer comprises a Ti—Al alloy, and the second non-magnetic underlayer comprises a Ru—Al alloy.

11. The method for manufacturing a magnetic recording medium according to claim 10, wherein the first non-magnetic underlayer is 30 nm thick, and the second non-magnetic underlayer is 30 nm thick.

12. The method for manufacturing a magnetic recording medium according to claim 1, wherein said recording layer is a first recording layer, and further comprising:
   forming an intermediate layer on said first recording layer; and
   forming a second recording layer on said intermediate layer.

13. The method for manufacturing a magnetic recording medium according to claim 12, wherein said second recording layer contains at least Co, silicon, and oxygen and is formed by a sputtering method,
   wherein, a target used in forming said second recording layer contains at least one selected from Co and a Co-based alloy and powdered silicon oxide in which said silica powder is crystalline.

14. The method for manufacturing a magnetic recording medium according to claim 13, wherein
   the powdered silicon oxide contained in said target has a main peak at a Bragg angle (2θ) of 26.6±0.1° in a powder X-ray diffraction spectrum by using CuKα rays.

15. The method for manufacturing a magnetic recording medium according to claim 13, wherein
   said target has a peak at a Bragg angle (2θ) of 26.6±0.1° in an X-ray diffraction spectrum by using CuKα rays.

16. The method for manufacturing a magnetic recording medium according to claim 12, wherein said first recording layer is 5 nm thick, and said second recording layer is 15 nm thick.

17. The method for manufacturing a magnetic recording medium according to claim 16, wherein said intermediate layer comprises Ru.

18. The method for manufacturing a magnetic recording medium according to claim 17, wherein said intermediate layer is 0.6 nm thick.

19. The method for manufacturing a magnetic recording medium according to claim 12, further comprising:
   forming a soft magnetic underlayer over said non-magnetic underlayer prior to forming said first recording layer.

20. The method for manufacturing a magnetic recording medium according to claim 19, wherein said soft magnetic underlayer comprises a three-layered structure of a CoTaZr alloy layer, a Ru layer, and another CoTaZr layer.

21. A method for manufacturing a magnetic recording medium comprising:
   forming a non-magnetic underlayer over a non-magnetic substrate;
   forming a soft magnetic underlayer over said non-magnetic substrate;
   forming a first recording layer containing at least Co, silicon, and oxygen over said soft magnetic underlayer;
   forming an intermediate layer on said first recording layer; and
   forming a second recording layer on said intermediate layer;
   wherein, a target used in forming said second recording layer contains at least one selected from Co and a Co-based alloy and powdered silicon oxide in which said silica powder is crystalline.

22. A method for manufacturing a magnetic recording medium according to claim 21, wherein
   the powdered silicon oxide contained in said target has a main peak at a Bragg angle (2θ) of 26.6+0.1° in a powder X-ray diffraction spectrum by using CuKα rays.

* * * * *